Sept. 27, 1927.
A. W. MEIER
1,643,723
SELF ADJUSTABLE UNIVERSAL JOINT CASING
Filed May 4, 1927
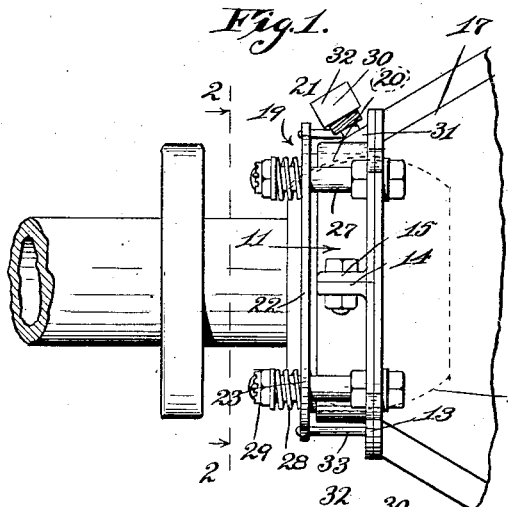
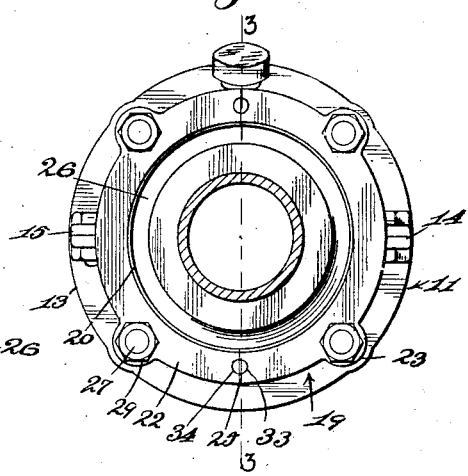
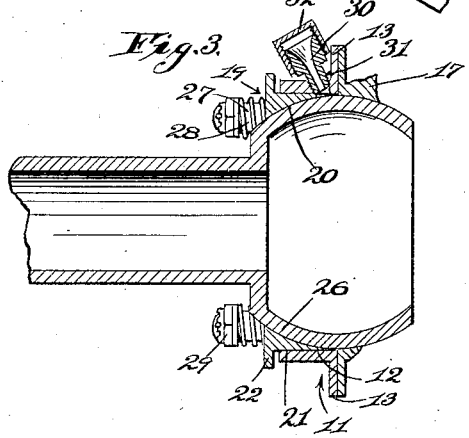
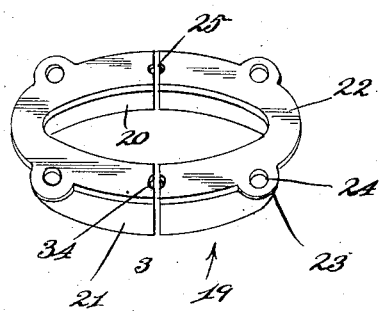
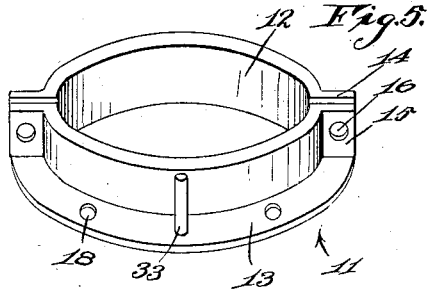
Inventor
Axel W. Meier
by Hazard and Miller
Attorneys Patented Sept. 27, 1927.

1,643,723

UNITED STATES PATENT OFFICE.

AXEL W. MEIER, OF LONG BEACH, CALIFORNIA, ASSIGNOR OF ONE-HALF TO GEORGE F. CARSON, OF LOS ANGELES, CALIFORNIA.

SELF-ADJUSTABLE UNIVERSAL-JOINT CASING.

Application filed May 4, 1927. Serial No. 188,703.

My invention is a self adjustable universal joint casing forming a casing joint which may be attached to a transmission or other part of a vehicle and house the universal joint.

An object of my invention is the construction of a universal joint casing which may be secured to a transmission casing or other structure of an automobile and house the universal joint leading from the transmission to a propeller shaft or the like, and to make this joint self adjustable so that it will conform to the shape and to the movement of the casing in its rocking or shifting movement in an angular direction.

In forming my casing I use a clamping ring which may be secured to a transmission casing or the like, this ring having a cylindrical part with a flange thereon, the flange being adapted to bolt to a transmission casing. This clamping ring is preferably split and formed in two parts. A self adjusting bearing ring is internally shaped spherical and on its exterior is cylindrical to fit in the cylindrical part of the clamping ring, the spherical part bearing against the spherical part of the joint casing. This ring has a flange extending outwardly with bolt holes therethrough and bolts are secured through such flange and to the flange of the clamping ring. Instead of being clamped tight, springs are inserted between the flange of the bearing ring and the head of the bolts, giving a spring pressure holding the bearing in place and thus giving a self adjusting function to same.

My invention will be more readily understood from the following description and drawings, in which:

Figure 1 is a side elevation of my invention.

Figure 2 is a vertical transverse section on the line 2—2 of Fig. 1 in the direction of the arrows.

Figure 3 is a longitudinal section of Fig. 2 on the line 3—3 in the direction of the arrows.

Figure 4 is a perspective view of the bearing ring.

Figure 5 is a perspective view of the clamping ring.

The clamping ring, designated generally by the numeral 11, has a cylindrical inner surface 12 and a right angular flange 13 formed thereon. This ring preferably has a split 14 with lugs 15 having bolt holes 16 therethrough to bolt the two sections of the ring together. This ring is held to a transmission or other casing 17, which may be part of an engine, by passing bolts through bolt holes 18.

The bearing ring, designated generally by the numeral 19, has a spherical inner surface 20 and a cylindrical outer surface 21, this latter fitting in the cylindrical portion 12 of the clamping ring. The ring is also provided with a flange 22 with projecting lugs 23, having bolt holes 24 therethrough. This bearing ring is also split, as indicated at 25, the spherical surface 20 being designed to fit against the spherical part 26 of a joint casing. The transmission casing 17, the universal joint casing 26, and the clamping and bearing rings, are assembled as shown in Fig. 3, with bolts 27 extending through the flange of the transmission casing, the bolt holes 18 of the flange 13 of the clamping ring, and through the bolt holes 24 of the bearing ring. Compression springs 28 are under compression between the flange 22 of the bearing ring and the locking nuts 29 on the outer end of the bolts. By this construction the bearing ring is forced inwardly in the clamping ring and against the universal joint casing with a pressure which is to a certain extent yielding and forms a self adjusting feature in this assembly. In practice the split joint 14 of the clamping ring and the split joint 25 of the bearing ring are preferably placed at right angles one to the other.

In order to lubricate the casing of a universal joint casing and the universal joint, if desired, a grease cup 30 is screw threaded through a boss 31 on the clamping ring, this grease cup having a cap 32.

From the above description it will be seen that I have developed a universal joint casing which is self adjustable, holds the joint or a casing carrying the joint in proper alignment, and allows a certain flexibility in the bearing of the bearing ring on the joint and inside the clamping ring.

My present invention may be regarded as an improvement in this feature over my application Serial No. 133,895, filed September 7, 1926, for adjustable universal joint couplings.

In order to provide for actuating and centering of the clamping ring and the bearing ring, I provide a pair of dowels 33 on the flange 13 of the clamping ring, such dowels fitting in an aperture 34 in the flange 22 of the bearing ring. This aperture may be located in the splits 25.

Various changes may be made in the principles of my invention without departing from the spirit thereof, as set forth in the description, drawings and claims.

I claim:

1. A universal joint comprising in combination a clamping ring adapted for attachment to a transmission casing, a bearing ring fitting in the clamping ring, means resiliently pressing said bearing ring in the clamping ring, and the bearing ring having a spherical inner surface to engage a universal joint casing.

2. A universal joint comprising in combination a clamping ring, having means to attach same to a transmission casing, a bearing ring slidable therein, and spring means pressing the bearing ring in the clamping ring, the bearing ring having an internal surface to conform to the curved surface of a universal joint casing.

3. A universal joint comprising in combination a clamping ring having an inner cylindrical surface, a bearing ring slidable on said cylindrical surface, the bearing ring having an inner cylindrical surface to conform to that of a universal joint casing, bolts through the clamping ring and the bearing ring, and having springs on said bolts pressing the bearing ring in the clamping ring.

4. A universal joint comprising in combination a clamping ring formed in two parts with a split, said parts being bolted together, the clamping ring having an inner cylindrical surface, a bearing ring formed in a plurality of parts having a split, said bearing ring having an outer cylindrical surface to engage the inner cylindrical surface of the clamping ring, and an inner spherical surface to engage a similar surface in a universal joint casing, bolts securing the clamping ring to the transmission casing, there being bolt holes in the bearing ring through which the said bolts pass, and springs on the bolts pressing the bearing ring and forcing same in the clamping ring.

5. A universal joint comprising in combination a clamping ring having a part with an inside cylindrical surface, a flange at right angles to said part, with bolt holes therein, a bearing ring having a part with an outside cylindrical surface and an inside spherical surface, a flange on the bearing ring having bolt holes therethrough, bolts extending through the bolt holes of the clamping ring and the bearing ring, and having compression springs on said bolts thrusting the bearing ring in the clamping ring.

6. A universal joint comprising a clamping ring having a cylindrical part and a flange at right angles thereto with bolt holes therethrough, said clamping ring being split longitudinally and having means to clamp said split parts together, a bearing ring having an outer cylindrical part to fit in the clamping ring, having an internal spherical surface, an outwardly extending flange on the bearing ring having bolt holes therethrough, said bearing ring being split longitudinally, bolts extending through the bolt holes in the clamping ring and the bearing ring, and having springs thereon, said springs bearing against the bearing ring and thrusting same in the clamping ring.

In testimony whereof I have signed my name to this specification.

AXEL W. MEIER.